June 7, 1960 J. E. CARY ET AL 2,939,181
SELF PROPELLED FIBRE HARVESTING AND DECORTICATING MACHINE
Original Filed Sept. 29, 1953 6 Sheets-Sheet 1

INVENTORS.
John E. Cary
Russell E. Shafer
Valerie Cary
By Kenneth P. Snow Atty.

Fig. 2.

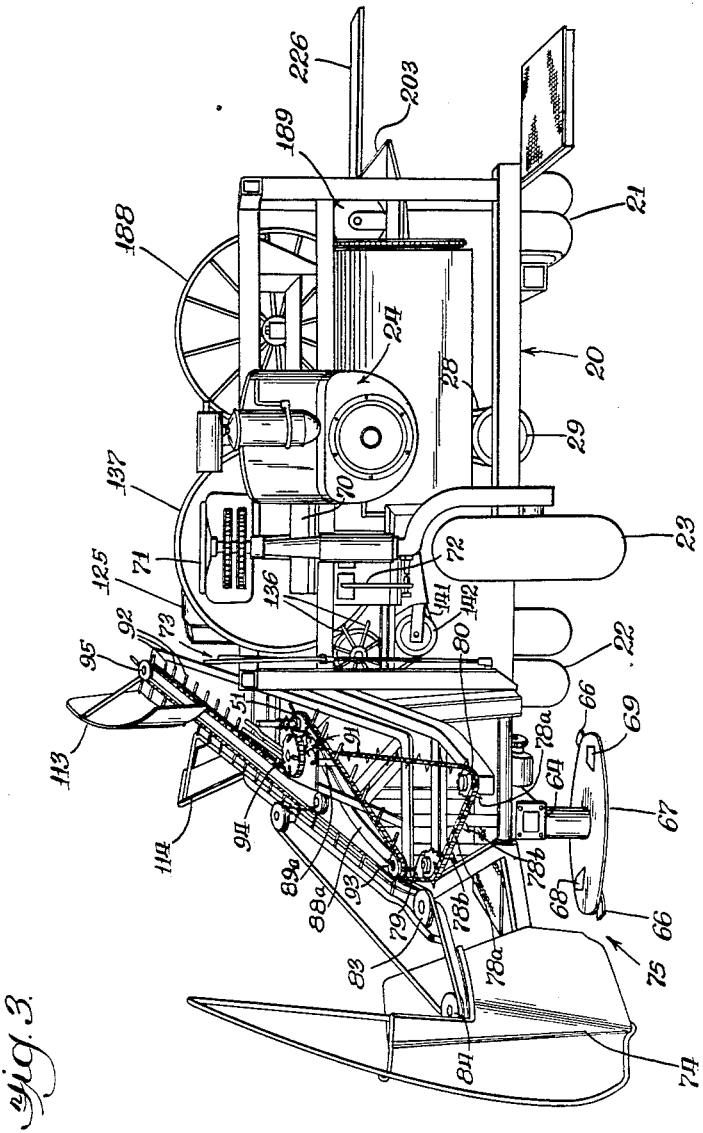

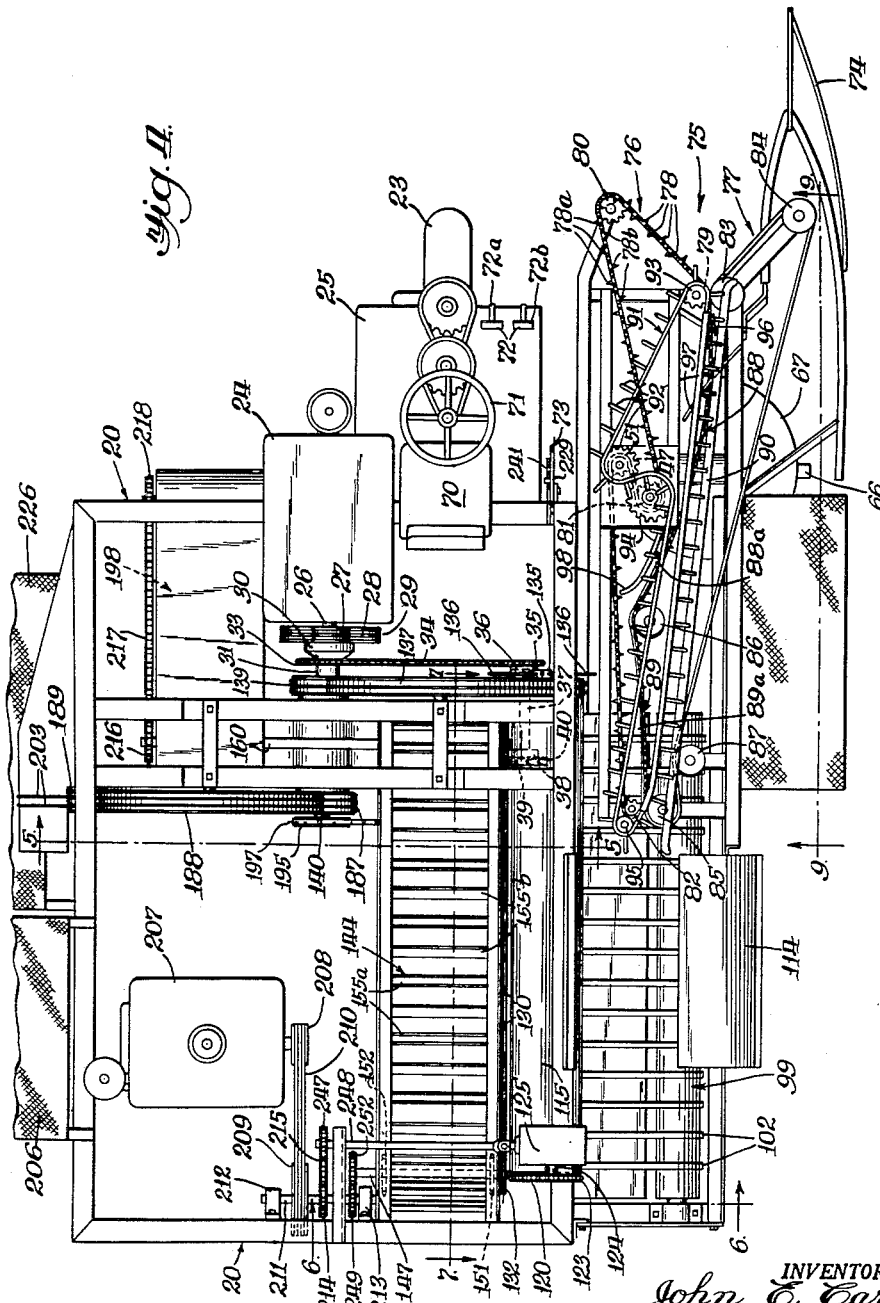

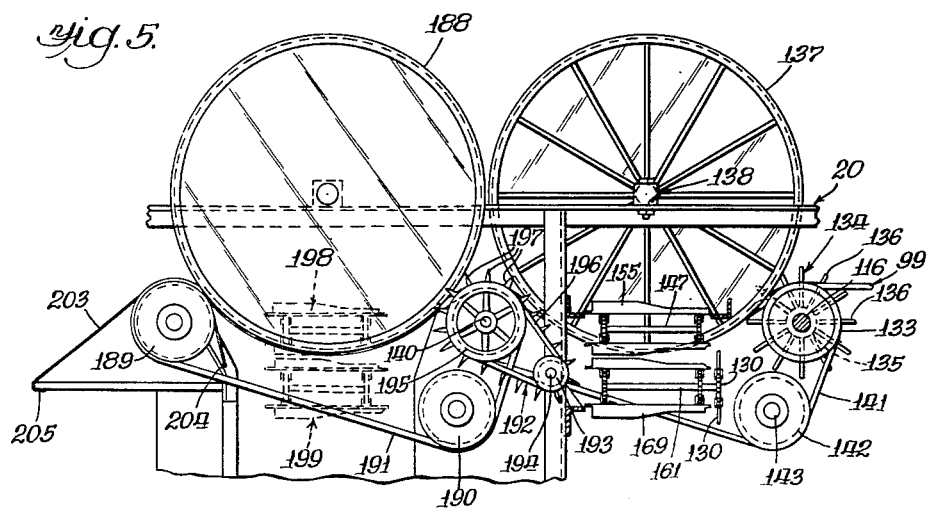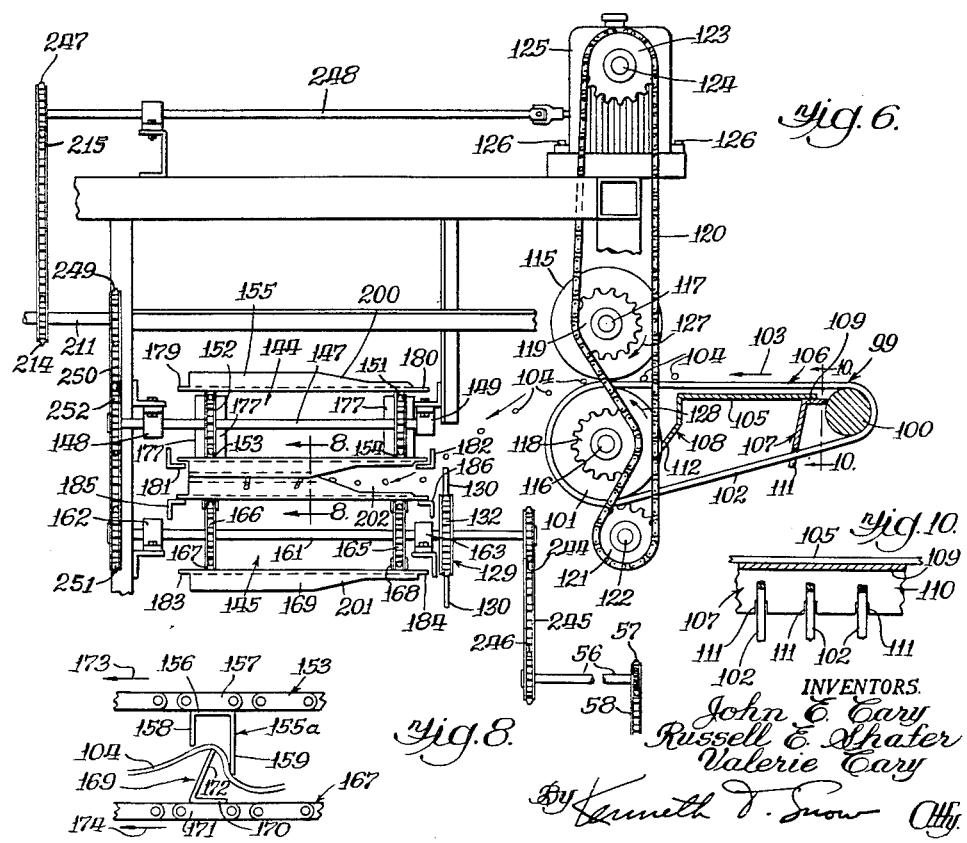

June 7, 1960 J. E. CARY ET AL 2,939,181
SELF PROPELLED FIBRE HARVESTING AND DECORTICATING MACHINE
Original Filed Sept. 29, 1953 6 Sheets-Sheet 6

INVENTORS.
John E. Cary
Russell E. Shafer
Valerie Cary
By Kennett T. Snow Atty.

United States Patent Office 2,939,181
Patented June 7, 1960

2,939,181
SELF PROPELLED FIBRE HARVESTING AND DECORTICATING MACHINE

John E. Cary, Russell E. Shafer, and Valerie Cary, all of Opelousas, La.

Original application Sept. 29, 1953, Ser. No. 383,064, now Patent No. 2,905,974, dated Sept. 29, 1959. Divided and this application July 26, 1956, Ser. No. 600,343

4 Claims. (Cl. 19—12)

This invention relates to a new and improved self propelled fibre harvesting and decorticating machine and is a division of our copending application Serial No. 383,064 filed September 29, 1953, now Patent No. 2,905,974.

Decorticating machines are employed for the purpose of separating the undesirable pulp from the usable fibres in stalk like fibre plants such as ramie, kenaf, Chinese grass, etc. As a general rule the harvesting of stalk fibres consists in the cutting of the stalks at their butt ends and thereafter bringing the stalks to a decorticating machine for the removal of the pulp. Time is of the essence in the performance of decortication inasmuch as there is a chemical change constantly progressing after the stalk has been cut making it more and more difficult to effect complete decortication. The fibre stalks include in addition to the usable fibres and the undesirable pulp a gummy resin or sap substance which causes the adhesion between the pulp and the fibres. The passing of time tends to harden these gums prior to removal of the pulp and unless decortication occurs relatively promptly after harvesting the stalks the resultant attempts at decortication are almost futile.

An important object of this invention is to provide a stalk moving conveyor, the bed of which comprises a plurality of uniformly spaced apart V-belts.

Still another object is to utilize the spaced apart V-belts of the conveyor for feeding stalks to a pair of preliminary feed or crushing rolls by training of the V-belts around one of the crushing rolls.

Another and further important object of this invention is the provision of means to maintain a fixed spacing of a plurality of V-belts constituting a stalk conveyor.

Another important object of this invention is to employ a shelf structure beneath the top flight of a conveyor composed of a plurality of V-belts wherein the shelf structure acts to maintain a fixed spacing of the plurality of V-belts.

Other and further important objects and advantages of this invention will become apparent from the disclosures in the following specification and accompanying drawings.

In the drawings:

Figure 2 is a perspective view taken from the other side of the machine.

Figure 3 is a front elevational view of the machine as shown in Figures 1 and 2.

Figure 4 is a top plan view of the machine.

Figure 5 is a transverse sectional view detail of the machine as taken on line 5—5 of Figure 4 with parts thereof broken away.

Figure 6 is an enlarged detail sectional view taken on the line 6—6 of Figure 4.

Figure 8 is an enlarged sectional detail of the chain scutching cross slats as shown in Figure 7 and taken on the line 8—8 of Figure 6.

Figure 10 is a sectional view detail taken on the line 10—10 of Figure 6 and having parts thereof broken away.

As shown in the drawings:

Figure 1:
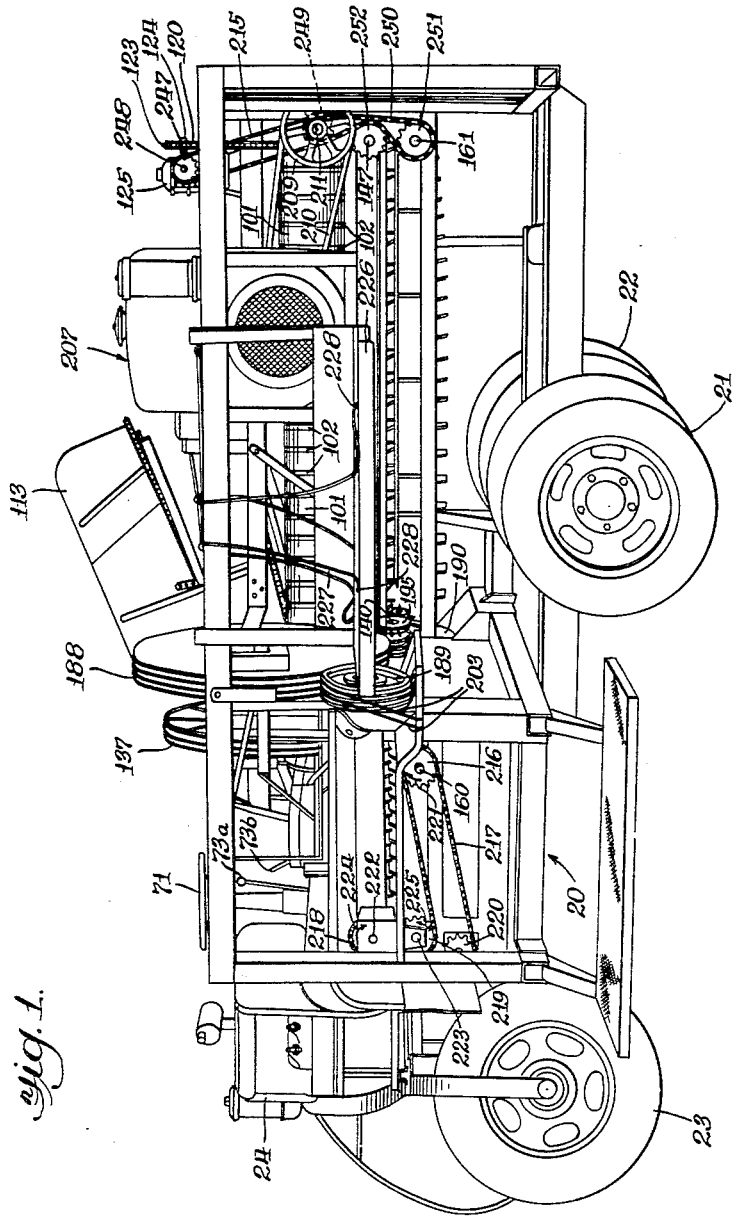
Figure 1 is a perspective view of the machine of this invention taken principally from one side thereof.

The reference numeral 20 indicates generally a frame supporting structure which is carried by rearwardly disposed, laterally spaced apart traction wheels 21 and 22. The forward end of the self propelled harvesting and decorticating machine is carried by a steerable wheel 23. The machine is thus equipped with a wheel supporting frame structure.

An engine 24 is mounted on the frame structure at the forward end thereof over the steerable or dirigible wheel 23 and adjacent an operator's station 25. The engine 24 is adapted to impart drive to the traction wheels 21 and 22 and to a stalk harvesting portion of the machine to be hereinafter described. As shown in Figure 4 the engine 24 has a drive shaft 26 carrying a plural V-pulley 27. A plurality of V-belts 28 transmit rotational drive from the pulley 27 to a relatively larger plural V-pulley 29. The large plural V-pulley 29 delivers drive to a change speed and reversing transmission 30. A propeller shaft 31 is driven by the transmission 30 and carries rotational drive rearwardly of the implement to a differential 32. From the differential the torque is divided and the laterally spaced traction wheels 21 and 22 are rotated.

A sprocket 33 is mounted on and driven by the propeller shaft 31 just rearwardly of the transmission. The harvesting elements receive their drive from this sprocket. A chain 34 is trained about the sprocket 33 and carries the rotational drive laterally of the vehicle frame structure to a sprocket 35. A manually operable clutch 36 is positioned close to the sprocket 35 whereupon the operator may as he desires maintain engagement or disengagement of the engine drive to the harvesting elements. It should be understood that this optional drive is separate and apart from the ground or propulsion drive which is delivered to the traction wheels 21 and 22.

Figure 9:
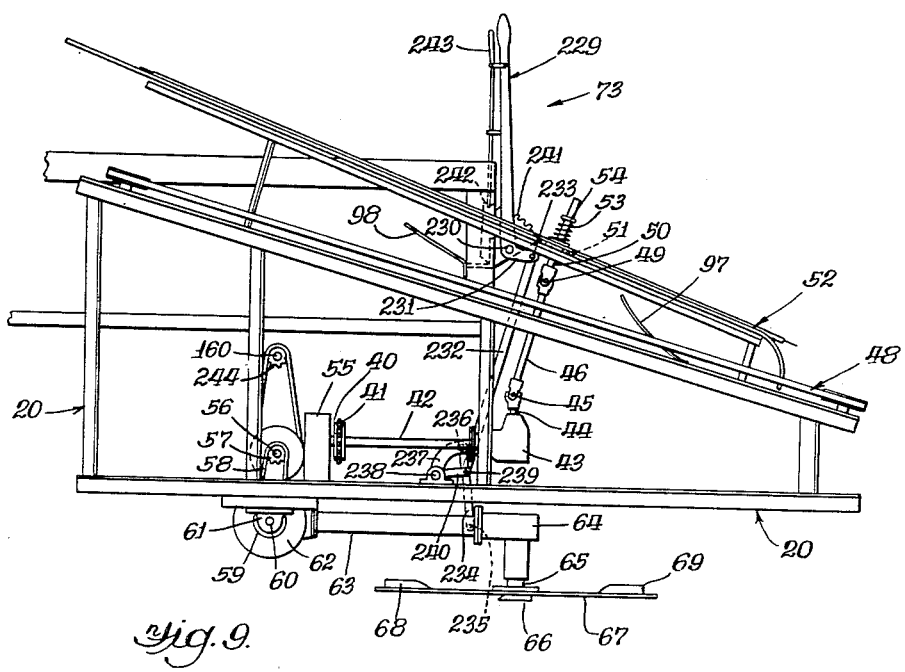
Figure 9 is an enlarged sectional view partially in side elevation of the device taken on line 9—9 of Figure 4.

A shaft 37 somewhat in the nature of a jack shaft carries the drive from the clutch 36 rearwardly for delivery to a one-way clutch device 38 and an adjacent sprocket 39. A chain 40 trained about the sprocket 39 transmits drive laterally to a sprocket 41 as shown in Figure 9. The sprocket 41 is keyed or otherwise fastened to a longitudinally extending shaft 42. A forward extension of the shaft 42 delivers drive to a gear box 43 which is supported on the frame structure 20. From this point drive is carried upwardly from the top of the gear box 43 by a shaft 44, through a universal joint 45 to an upwardly and forwardly inclined shaft 46. A sprocket 47 affixed to the shaft 46 is arranged to drive the primary stalk gathering elements now broadly identified as 48. An upward extension of the shaft 46 beyond the sprocket 47 is joined to a second universal joint 49. Another shaft 50 in substantial axial alignment with the shaft 46 is rotated by the universal coupling 49. A sprocket 51 is fastened to the shaft 50 spaced above the sprocket 47. The sprocket 51 is arranged to drive the secondary stalk gathering elements broadly designated as 52. A spring 53 surrounding the shaft 50 above the sprocket 51 is confined between the secondary stalk gathering element 52 and a spaced above collar 54. The spring 53 compensates for axial movement of the shafts 46 and 50 due to the inclusion of the universal joints 45 and 49. The sprocket 47 is smaller in diameter than the sprocket 51 and thus there is a differential in driving speed between the primary and secondary gathering elements 48 and 52. The fact that the sprocket 47 is smaller insures a slower speed for the primary or lower stalk gathering elements.

As will be later described this speed differential in stalk gathering elements contributes to a tilting of the incoming stalks in such a manner that the head of the stalk precedes the butt end of the stalk upwardly into the decorticator portion of the implement.

Figure 2:
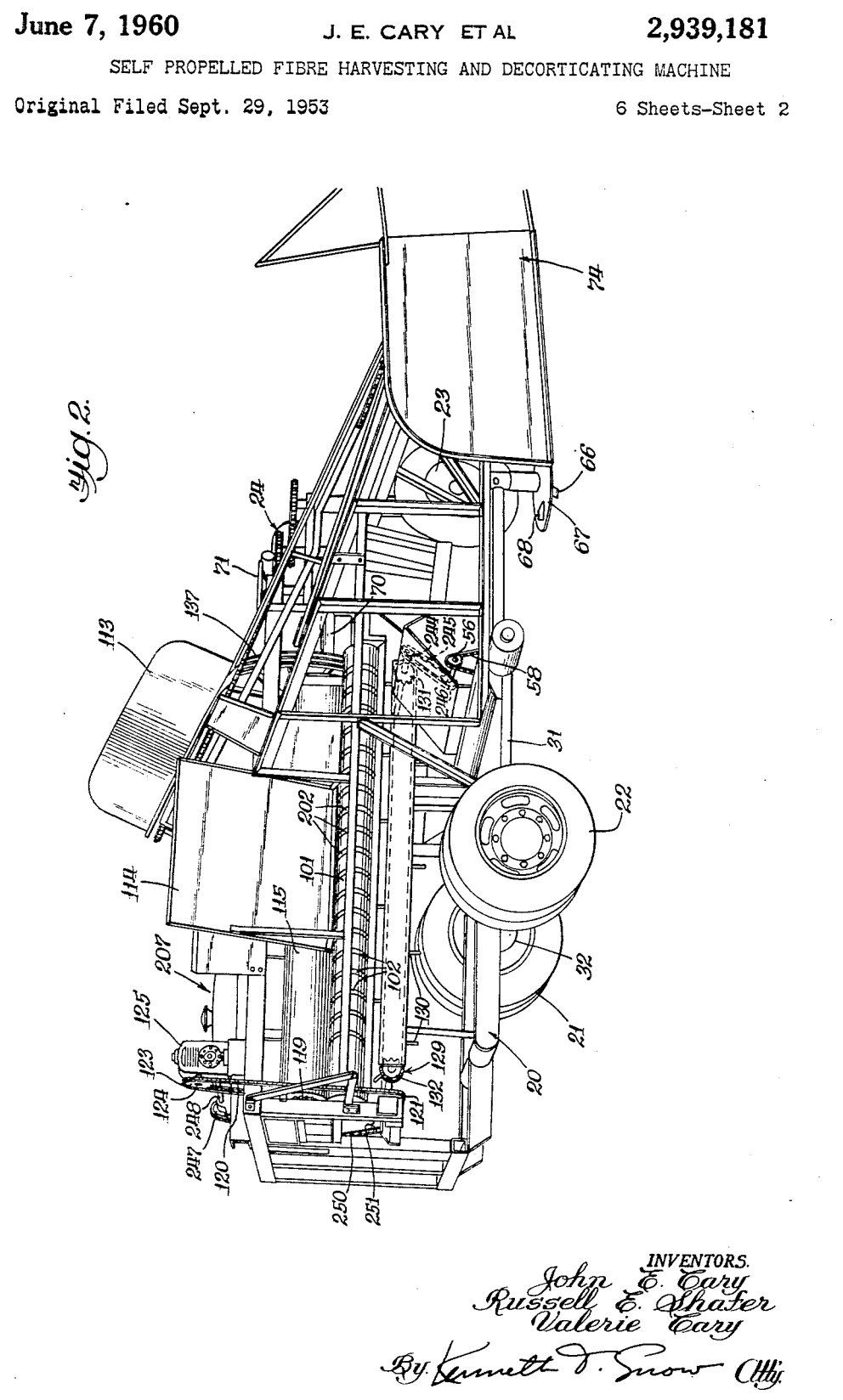

As shown in Figures 2 and 9 a sprocket 244 mounted on a shaft 160 driven by a second engine 207 is adapted to impart drive to a device for cutting the stalks at their butt ends. A chain 245 draped around the sprocket 244 extends downwardly to and around a sprocket 246 which is keyed or otherwise fastened to a shaft 56. The shaft 160 and the second engine will be later described in detail. A second sprocket 57 affixed to the shaft 56 has a chain 58 thereon for carrying drive downwardly to a sprocket 59 mounted on a shaft 60. The shaft 60 is supported on the frame structure 20 in hanger brackets 61. A gear box 62 is journally carried on the shaft 60 and transmits rotational drive forwardly through a propeller shaft 63 to a gear casing 64. A downwardly depending shaft 65 from the gear casing 64 supports a horizontally disposed stalk cutting blade 66. A disc 67 of somewhat less diameter than the length of the blade 66 is affixed to and rotates with the blade and its accompanying driving shaft 65. The effective range of stalk cutting thus is substantially the length of the blade 66 making it easy for an operator of the vehicle to follow a row of stalks to be harvested and to gather all the stalks regardless of how they are spaced. Upwardly extending paddles 68 and 69 form part of the disc 67 and prevent the disc platform from accumulating trash thereon.

It will thus be seen that the engine 24 performs the dual function of providing ground drive for the machine and providing drive for the gathering portion of the machine. Obviously the operator may cause ground drive without operating the harvester simply by disengaging the manually operable clutch 36. Further the one-way clutch 38 is a safety device to prevent reversal of movement of the gathering elements of the harvester when the ground drive of the vehicle is reversed and the manual clutch 36 has not been disengaged. This clutch 38 has not been shown in detail, but may be any one of the well known one-way clutches which join elements for rotation in one direction and overrun or prohibit the joint rotation in the other direction.

The operator's station 25 is equipped with a seat 70, a steering wheel 71 to control the angular position of the dirigible ground engaging wheel 23, various foot pedals 72, and hand engaging levers 73 generally to control the operation of various parts of the machine of this invention. The foot pedals are the clutch and brake indicated separately at 72a and 72b respectively. Similarly the hand levers are the gearshift lever 73a and the hand brake 73b.

The function of the machine is to traverse a field of standing fibrous stalks for the purpose of harvesting the stalks and immediately without delay decorticate the stalks so the usable fibres are separated from the undesirable pulp of the stalk. Ground drive for the implement has been shown and described and the harvesting portion of the machine has been preliminarily discussed insofar as the driven portions thereof are concerned. The harvester additionally includes an outside divider 74 which is adapted to pass through and divide the rows of standing stalks for delivery into a gathering throat designated as 75. The throat is substantially V-shaped as defined by cooperating endless members 76 and 77 of the primary stalk gathering and feeding mechanism 48. The endless member 76 is a roller chain having V-shape plate-like fingers 78 projecting outwardly therefrom alternately at the top and bottom. This facilitates the cooperative engagement of the endless flexible V-belt 77 therewith. As best shown in Figures 3 and 4 the V-belt nestles against the roller chain 76 between the alternately spaced upper V-plate projections 78a and the lower V-plate projections 78b. The endless chain is trained around a plurality of sprockets 79, 80, 81, 47, and 82 all of which are supported either directly or indirectly on the frame structure 20. The endless V-belt 77 is carried in spaced apart V-pulleys 83, 84, 85, and 86. A further V-pulley 87 on the frame structure 20 is adjustable toward and away from the normal path of travel of the V-belt 77 and acts as an idler to maintain the belt with the proper tautness. The nesting cooperation between the V-belt and chain of the primary stalk gatherer occurs in a first extended curved or arcuate path 88 lying between the sprocket 79 and V-pulley 83 at the forward end and the V-pulley 86 at the rearward end. The path 88 is formed by a stationary arcuate guide member 88a which forms a part of the frame structure 20 and guides the V-belt and chain in an arcuate path. This curved path 88 is relatively long and sweeping to enable stalks to be gripped between the chain 76 and V-belt 77 to be moved transversely of the machine out of the path of stalks subsequently harvested. A second arcuate or curved path 89 is formed by an arcuate guide 89a on the frame 20 wherein the chain and V-belt are guided upwardly and rearwardly of the first curved path 88 and more particularly between the V-pulley 86 and the V-pulley 85. This second curved path 89 is less severe than the first curved path and extends generally upwardly and rearwardly. The fingered roller chain 76 is driven as previously related by the sprocket 47 and the nesting cooperation of the chain with the V-belt 77 over the long extended curves 88 and 89 imparts corresponding drive to the V-belt. This insures that any standing stalks which are guided into the V-shaped throat 75 by the divider 74 and the forward progress of the machine will be firmly gripped by the cooperative chain and V-belt with the V-plate fingers "biting" into the stalks. The rotating, horizontally disposed cutter blade 66 is positioned directly beneath the first curved path 88 whereby the stalks gripped between the chain and V-belt will be severed at their butt ends and the stalks thereafter conveyed upwardly and rearwardly between the chain and V-belt.

The secondary stalk gathering member 52 comprises a relatively flat inclined plate strip 90 extending from a position above the V-pulley 83 to a position above and somewhat rearwardly beyond the V-pulley 85. An endless chain 91 is equipped with straight outwardly extending fingers 92 which are adapted to ride on the plate strip 90 in the manner of a track. The endless chain 91 is extended around the spaced sprockets 93, 51, 94, and 95. Here again this chain is driven by the sprocket 51 which is carried on the aligned driven shafts 46 and 50 in the same manner as the chain 76 is driven by the sprocket 47. An arrow 96 directed toward the rear of the machine indicates the effective direction of travel of the endless chain conveyor 91. This endless chain 91 constituting the secondary gathering element 52 is spaced above the primary gathering element 48 and cooperates therewith to effectively feed fibre stalks upwardly and rearwardly in an orderly manner for subsequent decortication. The secondary gatherer 52 provides upward and rearward movement of the stalk at a speed in excess of the speed of primary gatherer and thus the differential in speed as previously stated tends to tip the stalks rearwardly to deliver the head ends to the top of the machine first.

As the arcuate engaging portions of the chain 76 and V-belt 77 grip the stalks the slightly offset cooperative guide track 90 and advancing fingers 92 cause the stalks to tilt in a transverse direction with the butt ends thereof being swung inwardly of the machine. In order to insure this stalk tilting, guide rods 97 and 98 are mounted on the frame structure 20 beneath the primary gathering element 48 in such a manner that the butt ends are "kicked" laterally at a position just above the cutter 66 by the rod 97 and finally by the curved rod 98 located adjacent and beneath the upper end of the first curved path 88. Thus by the time the cut, harvested stalks reach the top of the first arcuate path 88 their butt ends are completely out of the way of incoming stalks and their head ends are inclined substantially rearwardly. The stalks are finally discharged at the upper ends of the primary and secondary gatherers in such a manner that they lie in a longitudinal position with their heads to the rear of the machine for easy dropping onto a longitudinally extending transversely running conveyor 99. This completes the description of the harvesting portion of the machine.

The conveyor 99 is for the purpose of delivering harvested fibre stalks into the decorticating elements of the machine. The conveyor 99 shown in Figures 2, 4, and 6 is of unusual construction and is most effective in the transporting of stalks. As best shown in Figure 6 the conveyor includes spaced apart drum pulleys 100 and 101. A plurality of individual V-belts 102 are disposed around these pulleys 100 and 101 in a uniform longitudinal spacing. The belts are all driven in an inward direction as shown by the arrow 103 whereupon the stalks dropped thereon from the harvester are moved inwardly in a translational manner. In order to obtain a clearer understanding of the action of the conveyor 99 a few stalks shown at 104 are positioned thereon. The conveyor 99 further includes a shelf or table part 105 which is spaced slightly beneath the upper movable bed 106 of the conveyor. The bed 106 is defined as the upper runs of the plurality of V-belts 102. The shelf 105 is affixed to and forms a part of the frame structure 20. Angle members 107 and 108 are fixedly fastened to the shelf 105 at each of the lateral edges and depend downwardly therefrom. These angle members act as scrapers for the rolls 100 and 101 respectively for the purpose of maintaining the rolls clean even though they are an integral part of the conveyor feeding gummy stalk materials.

The angle member 107 has one arm 109 projecting toward and contacting the roller 100 as the scraping means therefor. As best shown in Figure 10 a downwardly depending arm 110 of the angle 107 is regularly notched as at 111 along the length of the roll 100. These notches 111 act as guides for the V-belts and maintain the uniform longitudinal spacing thereof.

The angle member 108 has a laterally inclined leg or arm 112 which has scraping contact with the larger roll 101 carrying the inner ends of the plurality of V-belts 102. It will thus be seen that both of the rollers constantly have their peripheral surfaces cleaned.

The stalks are guided in their transition from engagement by the stalk gathering elements to the bed 106 of the conveyor 99 by means of an upwardly projecting guide sheet 113 located in substantial alignment with the inside of the conveyor 99 and a relatively high guide sheet 114 located on the outside edge of the conveyor 99. Thus when the stalks fall from the harvester they are guided onto and laid in a uniform longitudinal manner on the conveyor 99.

The first actual treatment of the stalks for decortication is the passing of the stalks through vertically spaced apart cooperative rolls 115 and 101. The lower of these rollers 101 is of course one of the drum pulleys for the plural V-belt conveyor 99 and as the stalks 104 are carried inwardly on the V-belts 102 they are subjected to the crushing action of the upper roller 115. Preliminary crushing of the stalks has proved to be advantageous in the subsequent removal of the pulp from the usable fibres. The roller 101 is carried on a shaft 116 and similarly the cooperating roller 115 is carried on a shaft 117. Both of these roll carrying shafts are journally supported on the frame structure 20. Sprockets 118 and 119 are keyed or otherwise fastened to the shafts 116 and 117 respectively and are located in the same plane whereby a chain 120 passing therearound in the manner shown in Figure 6 delivers positive drive to both rollers and thus also the multiple V-belt conveyor 99. An idler sprocket 121 is mounted on a shaft 122 located beneath the roller 101 in the same plane with the sprockets 118 and 119. The chain 120 is driven by a sprocket 123 which is mounted on and driven by a shaft 124 projecting outwardly from a gear box 125. The gear box 125 is fixedly mounted on the top of the machine frame structure 120 by means of bolts 126. The sprockets 118, 119, 121, and 123 are all in planar alignment thus permitting the chain to be trained thereabout in a manner to impart rotational drive from the sprocket 123 to the roller 115 in the direction of the arrow 127 and to the roller 101 in the direction of the arrow 128. The employment of the idler sprocket 121 permits the rolls 101 and 115 to be driven inwardly toward each other as cooperative feed rolls for the fibre stalks 104.

The next step in the decorticating process is the removal of leaf matter from the stalks and to simultaneously straighten the stalks prior to their entry into the actual pulp scutching means. This step is accomplished by a longitudinally extending chain member 129 having outwardly projecting fingers 130. This defoliating chain 129 is carried on spaced apart sprockets 131 and 132 as shown in Figure 2. The chain is horizontally disposed and extends from the fore part of the machine to the rear with the top run thereof moving from front to rear. Thus when crushed stalks are moved into the scope of travel of the defoliating chain 129 the fingers 130 move in a combing action to simultaneously remove leaves therefrom and to straighten the stalks whereafter they may be uniformly decorticated.

As best shown in Figure 5 a plural V-pulley 133 is affixed to the shaft 116 at the forward end of the roller 101. Further a rotor member 134 having a hub 135 and radially extending fingers 136 is attached to the shaft 116 and rotates therewith at a position forwardly of and closely adjacent the V-pulley 133. Another and substantially larger plural V-pulley 137 is journally mounted on the frame structure 20 at 138. Still another plural V-pulley 139 is mounted on a shaft 140 located at a position lower than and laterally inwardly of the mounting of the large plural V-pulley 137. Plural V-belts 141 are arranged to ride around and/or against the plural V-pulleys 133, 137, and 139 which lie in planar alignment with each other. A plural V-pulley idler 142 is carried on a shaft 143 and is adapted to provide proper tension for the V-belts 141 and to get the lower flights of the V-belts down out of the way of the effective operating upper flights of the V-belts. The plural V-belts 141 ride within a lower portion of the circumference of the very large plural V-pulley 137 and it is this cooperative engagement that provides for the stalk gripping means during part of the decortication. The rotor member 134 with its long radial fingers 136 insures the controlled passage of stalks from the crushing rolls to the first decorticating means as best shown in Figures 5 and 6.

Figure 7:
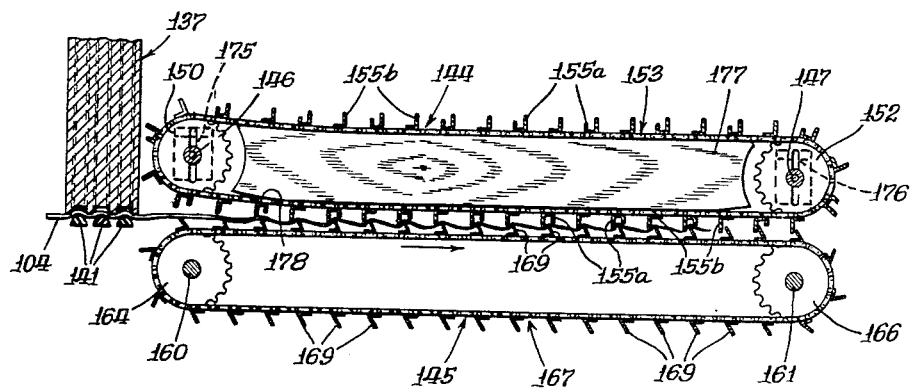
Figure 7 is an enlarged sectional view detail taken on the line 7—7 of Figure 4.

The butt ends of the stalks ride on the multiple V-belts 102 of the conveyor 99 and also on the plural V-belts 141 so that they are positively fed to the juncture between the V-belts and the V-pulley 137. This crimped gripping of the butt ends of the stalks 104 is shown in Figure 7 and for convenience will be termed the first stalk gripping means. It is evident that the gripping of the stalks is made quite positive before the stalks are defoliated or combed by the fingered, narrow, chain conveyor 129.

The decorticating means comprises vertically spaced apart endless chain conveyors 144 and 145. These conveyors or flexible members 144 and 145 are constructed in much the same manner and it is the cooperating surfaces therebetween that scutch or otherwise remove the pulp from the fibrous stalks. The decorticator chains 144 and 145 are best shown in Figures 6, 7, and 8. The upper chain 144 includes longitudinally spaced apart shafts 146 and 147. These shafts are journally carried in hanger bearings 148 and 149 which in turn are fixedly mounted on the supporting structure 20. Laterally spaced sprockets 150 (only one of which has been shown in the drawing) are affixed to the cross shaft 146 at one end of the chain and similarly the other end of the chain is provided with laterally spaced sprockets 151 and 152 on the shaft 147. The upper chain structure 144 further includes spaced apart side chain members 153 and 154 which extend around the longitudinally spaced sprockets 150, 151, and 152. The side chains 153 and 154 are joined by stalk scutching cross slats 155. The cross slats 155 on the upper chain 144 are alternately U-shape 155a and right angle or L-shape 155b in cross section or as viewed from the ends of the slots. One of these U-shaped slats 155a is shown in greater detail in Figure 8. The U or channel slat 155a has a base 156 attached to and forming a part of a roller chain link 157 of the chain 153. Similarly the other end of the channel is attached to the side chain 154. The channel 155a has downwardly depending sides or legs 158 and 159 of different lengths. The leg 158 is shorter than the leg 159 and this length differential contributes to aggressive scutching of the fibrous stalks such as ramie.

The lower chain 145 of the decorticator has its extension defined by spaced shafts 160 and 161. These shafts also carry the defoliating chain sprockets 131 and 132 respectively so that the length of the defoliating chain is substantially co-extensive with the lower decorticating chain 145. The shaft 161 is journally supported in pillow block bearings 162 and 163 which in turn are carried on the frame structure 20. Spaced apart sprockets 164 are affixed to the shaft 160 and in the same manner as for the above chain member 144 aligned spaced apart sprockets 165 and 166 are provided on the shaft 161. Side chains 167 and 168 are extended around the longitudinally spaced apart and aligned sprockets 164, 165 and 166. Cross slats 169 in the form of angle members join the spaced side chains 167 and 168 and cooperate with the U-shaped channel members 155a and the right angle cross slats 155b of the upper chain 144 to cause a scutching of the fibre stalks. The cross slats 169 as shown in Figure 8 have a base 170 fastened to a roller link 171 of the chain 167. As clearly shown in Figure 6 the slat is also joined to a corresponding link on the other side chain 168. An inclined leg or arm 172 projects upwardly for interengagement within the channel 155a and adjacent the right angle slat 155b. The cooperating intermediate sides of the chains 144 and 145 are each arranged to move in the direction of the arrows 173 and 174. A fibre stalk 104 is shown in between the telescoping scutching cross slats 155 and 169. The stalks 104 are held by the first gripping means at their butt ends during which time these scutching chains drag over the length of the stalks away from the holding means. The nesting or telescoping of the cross slats cause the stalks to assume a tortuous path in an aggressive and positive scraping loose of the pulp from the usable fibres. The angled arm 172 of the lower cross slat is bent back from the direction of movement over the stalk and the particular positioning of this angled arm with respect to the long and short arms 158 and 159 of the upper cross slat is all material to the effective scutching of the stalks.

A further principle to obtain maximum decortication has been added in the form of curving the upper chain 144 from one end to the other. This is accomplished by providing for the separate vertical adjustment of the sprockets 150 and 151 which are mounted within vertical slots 175 and the sprockets 152 which are mounted within vertical slots 176. The slots are located in the supporting hanger bearings. Relatively long wooden blocks 177 with curved undersides 178 are fixedly attached to the frame structure 20 and positioned within the upper and lower runs of each of the side chain members 153 and 154. The curvature of the underside of the blocks conforms to the desired curvature and constitutes a guide for the upper scutching chain. The initial portion of the engagement of the cross slats is relatively spaced apart so there will be less telescoping of the angled arm 172 within the U-shaped channel 155. As the chains progress away from the gripping means it is desirable to have greater interengagement of the cross slats for a more pronounced "saw tooth" effect on the corresponding portions of the stalks being decorticated. Finally the chains are preferably slightly separated at their outer ends as shown as there is not the necessity of maximum aggression on the heads of the stalks which are of smaller diameter.

Each of the cross slats on the upper and lower chains has flat lateral side extensions which are guided in fixed tracks. As shown in Figure 6 the slats 155 have side projections 179 and 180 adapted to ride on tracks 181 and 182 which are in the form of angle members fixably mounted on and with the frame structure 20. Similarly the lower chain cross slats 169 have side extensions 183 and 184 which ride on and are held in upper chain engaging position by the fixed spaced apart tracks 185 and 186. In the same manner as the stalk gripping means has been termed the first stalk gripper or holder so also the chains 144 and 145 shall be referred to as the first decorticator. The first gripper holds the butt ends of the stalks while the major portion of the length thereof including the heads are decorticated by the first decorticator.

Decortication is not complete because the butt ends have not been cleaned and it is thus the function of this machine to subsequently grip the stalks at or near the heads of the stalks while the butts are scutched. This stage of the machine requires a second gripper and this is similar to, but spaced longitudinally from the first gripper. The second stalk gripper includes a plural V-pulley 187 mounted on the shaft 140 spaced from the plural V-pulley 139, a very large plural V-pulley 188 corresponding to the pulley 137, a plural V-pulley 189, and an idler plural V-pulley 190. All of these pulleys are in vertical planar alignment and are journally carried on the supporting structure 20. Plural V-belts 191 are trained around the pulleys just described in much the same manner as the V-belts 141 are employed in the first stalk gripper. The stalks are crimpedly held in the second gripper between the V-belts 191 and the annular V-notches of the large plural V-pulleys 188.

When stalks are discharged from the first gripper they are assisted in their elevation from the first decorticator by a fingered V-belt broadly designated as 192 in Figure 5. A V-pulley 193 is journalled at 194 on the frame structure 20 at a position just beneath the discharge side of the first decorticator. A second larger V-pulley 195 is mounted on the shaft 140 closely adjacent the plural V-pulleys 187 as shown in Figure 4. A V-belt 196 is extended around the pulleys 193 and 195 and its upper run provides a movable inclined track between stalk grippers. Outwardly projecting fingers or spikes 197 form an integral part of the V-belt 196 and insure the transporting of stalks up the inclined path. From this point forward in the progress of the decorticator of this machine the actions are repetitious, but in an opposite direction. The stalks 104 are fed into the second gripper by the fingered belt 192 and are gripped at their upper ends between the V-belts 191 and the large V-pulleys 188. While the stalks are so held they are subjected to the second decorticator comprising upper and lower cross slatted scutching chains 198 and 199. The details of the scutching chains are identical to the chains 144 and 145 and hence will not be repeated in detail here. The chains 198 and 199 are arranged and constructed to run away from the second gripping means at their cooperating surfaces. In this manner the entire length of stalk is decorticated in two stages. The depulping action of the first decorticator causes the pulp to be discharged rearwardly of the machine and similarly the depulping action of the second decorticator causes the pulp to be propelled forwardly out of the machine from between the scutching chains 198 and 199.

Both the first and second decorticators are constructed with wide mouths to permit easy entry of the stalk material. This is clearly shown in Figure 6 wherein the sides of the cross slats 155 and 169 are tapered as shown at 200 and 201 respectively from a point substantially inwardly of the slats to a position adjacent the side extensions thereof. Thus where the slats come together there is a wide opening at the stalk entering end designated generally as 202. This type opening not only makes it easier for the stalks to enter, but creates a slight suction for pulling the stalks into the main scutching portions of the cooperating decorticating chains. The shape of the cross slats are such that the full portions tend to move a quantity of air thus causing more air to be pulled inwardly from the wide mouthed ends at 202. This, of course, creates the suction mentioned herein.

In order that there shall be no tendency for decorticated fibres to stick to and follow any of the moving elements a plurality of taut wires 203 are fastened to the frame structure 20 at 204 and extend upwardly over and through the V-notches of the plural V-pulley 189, and thence downwardly and outwardly for fixed attachment at 205. Thus as the fibres are discharged from the second gripper they are forced to ride over onto the top of the taut wires 203 whereupon an operator standing on the platform 206 may conveniently tie or bundle the fibres in a manner for convenient subsequent washing treatment or curing or the like.

As shown in Figure 4 a second engine 207 is adapted to operate all of the decorticating elements of the machine independently of the ground and gathering driving engine 24. A plural V-pulley 208 driven directly by the engine 207 transmits its drive to a plural V-pulley 209 by plural V-belts 210. The pulleys 209 are mounted on a jack shaft 211 journally supported in spaced hanger bearings 212 and 213 mounted on the frame supporting structure 20. A sprocket 214 keyed or otherwise fastened to the shaft 211 has a chain 215 therearound for the purpose of delivering rotational drive to a sprocket 247. This last named sprocket is carried on and drives a shaft 248 which leads to and imparts drive to the gear box 125. A second sprocket 249 on the jack shaft 211 has a chain 250 thereon for effecting drive of sprockets 251 and 252. The sprocket 251 is fastened to the outer end of the shaft 161 and the sprocket 252 is unitary with the shaft 147. It should thus be apparent that drive from the engine 207 is delivered to the cooperative chain decoraticators 144 and 145.

The second decorticator is driven from the same source of power as the first decorticator. The shaft 160 of the lower chain 145 in the first decorticator is extended laterally as shown in Figure 4 and passes through the inner end of the lower chain of the second decorticator. However, the second decorticator is not driven directly thereby as it would be travelling in the wrong direction. Thus, although the shaft 160 supports the one end of the decorticator the lower chain is journally mounted thereover rather than being drivingly attached thereto. A sprocket 216 is keyed or otherwise fastened to the outer end of the shaft 160 and by means of a chain 217 delivers rotational drive to the sprockets 218 and 219. An idler sprocket 220 is also in vertical planar alignment with the sprockets 216, 218, and 219 and provides for the driving thereof in the proper direction. Obviously the second decorticator must travel forwardly away from the second gripping means which is a direction opposite the direction of travel of the rearwardly running first decorticator. The shaft 160 is rotating in the direction of the arrow 221. The sprockets 218 and 219 to be driven are mounted respectively on shafts 222 and 223 which in turn carry the upper and lower chains 198 and 199 of the second decorticator. The chain 217 thus causes the sprocket 218 to be rotated in the direction of the arrow 224, and the sprocket 219 to be rotated in the direction of the arrow 225. The inner cooperating scutching surfaces of the chains 198 and 199 move in the same direction forwardly away from the second gripping means.

A fibre receiving deck 226 is located on the side of the machine rigidly with the frame structure 20. Several ropes 227 are fastened to the outer edge of the platform 226 at 228 and then are draped inwardly over the platform and then upwardly. The operator receiving decorticated fibres places bunches thereof on the platform or deck 226 over the ropes 227. When a sufficiently large load is on the deck the upper free ends of the ropes 227 are pulled causing the entire load of fibres to be dropped off the side of the machine. These loads of decorticated fibres are later picked up and given necessary subsequent treatment.

In the operation of the machine of this invention it is propelled through a field of growing ramie or other stalk fibre plants at which time it is guided into the V-throat of the gathering mechanism by the outside row divider. After the gatherers have firmly gripped the stalks they are cut at a point close to the ground line by the cutter 66. The operator may adjust this cutter assembly through a range of vertical movement by reason of movement of one of the hand levers 73 designated specifically as 229 in Figure 9 and associated linkage joining the cutter unit. The hand lever 229 is pivoted at 230 on the frame structure 20. The lever 229 is in bellcrank form having a shorter arm 231 projecting forwardly beyond the hinge 230. A link member 232 is pivotally attached to the outer end of the arm 231 at 233. A link 234 is pivotally attached at 235 on the cutter assembly tube 63. The upper end of the link 234 is pivotally joined at 236 to a curved link member 237 which is supported for hinged movement in a bearing 238. The lower end of the link 232 is joined intermediate the ends of the link 234 at 239. A short pivoting link 240 extends between the bearing 238 and the juncture 239. When the hand lever 229 adjacent the operator's platform is pulled back the cutter assembly is raised. Similarly when it is moved forwardly the cutter is lowered. The cutter through the hand lever is held in adjusted position by a fixed notched quadrant 241 provided at the lower end of the hand lever 229 along with the aid of a pawl 242 and hand releasing extension 243. The pawl 242 engages one of the notches in the arcuate surface of the quadrant 241 whereby wherever the hand lever is stopped and the pawl released the cutter will remain at its then vertical level until readjusted.

Subsequently the ramie or other stalks to be treated are dropped in a longitudinal position with their butt ends forwardly on the transversely running multiple V-belt conveyor. The stalks 104 are then fed laterally through the cooperative preliminary crushing rolls and thereafter are gripped at their butt ends by the first gripper and defoliated and straightened. Decortication throughout the remainder of the length of the stalks is then accomplished by the first decorticator while the butt ends are still gripped. The butt ends are finally released by the first gripper and the stalks gripped by the second gripper at a position near the heads of the stalks at which time the second decorticator performs its function on the butt end portion of the stalks.

It is apparent that herein is provided a complete self propelled harvester and decorticator which has all its parts peculiarly integrated in the successful and complete harvesting and decortication of fibrous stalks. Many details of construction may be varied throughout a wide range without departing from the principles disclosed herein and we therefore do not propose limiting the patent granted hereon otherwise than as necessitated by the appended claims.

What is claimed is:

1. A stalk feeding means comprising a frame structure, a conveyor on said frame structure for moving stalks, said conveyor including a plurality of spaced apart V- belts and spaced apart cylindrical rollers about which the plurality of V-belts are trained to form a surface bed on the upper surface thereof, a shelf fixed to said frame structure at a location spaced beneath the upper surface bed of the conveyor, and means associated with said shelf for maintaining the V-belts in fixed spaced apart position.

2. A stalk feeding device comprising a supporting structure, a pair of parallel disposed laterally spaced apart cylindrical rolls, said rolls having their upper surfaces on a substantially horizontal level, a plurality of V-belts mounted around said spaced apart cylindrical rolls in longitudinally spaced apart position, said V-belts having upper and lower flights, the upper flight of said V-belts constituting a conveyor bed on which stalks laying across said spaced V-belts may be fed, a cooperative cylindrical roller positioned directly above one of said V-belt carrying rollers whereby stalks fed thereby may be subjected to roll pressure, a shelf attached to said supporting structure and positioned between the upper and lower flights of the V-belts, and means on said shelf for maintaining said V-belts in fixed spaced apart position.

3. A device as set forth in claim 2 in which said means on said shelf includes a fixed arm member having a plurality of spaced apart notches therein, said arm located in the path of said V-belts, and said V-belts arranged and constructed to run through and be guided by said notches.

4. A stalk feeding device comprising a supporting structure, a pair of parallel disposed laterally spaced apart cylindrical rolls, said rolls having their upper surfaces on a substantially horizontal level, a plurality of V-belts mounted around said spaced apart cylindrical rolls in longitudinally spaced apart position, said V-belts having upper and lower flights, the upper flight of said V-belts constituting a conveyor bed on which stalks laying across said spaced V-belts may be fed, a cooperative cylindrical roller positioned directly above one of said V-belt carrying rollers whereby stalks fed thereby may be subjected to roll pressure, a shelf fastened to said supporting structure and positioned between said upper and lower V-belts flights, said shelf having spaced apart roll scraping members attached thereto whereby both of said rollers carrying said V-belts are continuously scraped.

References Cited in the file of this patent

UNITED STATES PATENTS

| | | |
|---|---|---|
| 370,286 | Sparr | Sept. 20, 1887 |
| 1,641,119 | Cook | Aug. 30, 1927 |
| 2,423,425 | Lundgren | July 1, 1947 |

FOREIGN PATENTS

| | | |
|---|---|---|
| 2,284 | Great Britain | of 1913 |
| 24,057 | Great Britain | of 1909 |
| 372,757 | Great Britain | May 10, 1932 |